US011092707B2

(12) United States Patent
Xu et al.

(10) Patent No.: US 11,092,707 B2
(45) Date of Patent: Aug. 17, 2021

(54) DETERMINING A COMPONENT OF A WAVE FIELD

(71) Applicant: STATOIL PETROLEUM AS, Stavanger (NO)

(72) Inventors: Sheng Xu, Katy, TX (US); Hongbo Zhou, Katy, TX (US)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 16/871,771

(22) Filed: May 11, 2020

(65) Prior Publication Data

US 2020/0271802 A1    Aug. 27, 2020

Related U.S. Application Data

(63) Continuation of application No. 15/110,585, filed as application No. PCT/EP2015/050352 on Jan. 9, 2015, now Pat. No. 10,705,233.

(30) Foreign Application Priority Data

Jan. 10, 2014  (WO) ................. PCT/EP2014/050423

(51) Int. Cl.
*G01V 1/30* (2006.01)
*G01V 99/00* (2009.01)

(52) U.S. Cl.
CPC .............. *G01V 1/30* (2013.01); *G01V 99/005* (2013.01); *G01V 2210/51* (2013.01); *G01V 2210/626* (2013.01)

(58) Field of Classification Search
CPC ............................ G01V 2210/67; G01V 1/30
See application file for complete search history.

(56) References Cited

U.S. PATENT DOCUMENTS

2011/0007604 A1   1/2011   Liu et al.
2013/0279293 A1  10/2013   Xu et al.

FOREIGN PATENT DOCUMENTS

CN          103091710 A       5/2013

OTHER PUBLICATIONS

Alkhalifah, "Traveltime approximations for inhomogeneous transversely isotropic media with a horizontal symmetry axis," European Association of Geoscientists & Engineers, Geophysical Prospecting. vol. 61, 2013, pp. 495-503.
Alkhalifah, Tariq, "An acoustic wave equation for anisotropic media", Geophysics, Society of Exploration Geophysicists, US, vol. 65, No. 4, Jul.-Aug. 2000, XP-002570798, pp. 1239-1250.
Chines Office Action and Search Report for Chinese Application No. 201580012711.3, dated Jul. 3, 2018, with partial English translation.
Chinese Office Action and Search Report, dated Jul. 4, 2017, for Chinese Application No. 201580012711.3, along with an English translation.

(Continued)

*Primary Examiner* — Kyle R Quigley
(74) *Attorney, Agent, or Firm* — Birch, Stewart, Kolasch & Birch LLP

(57) ABSTRACT

There is described embodiments relating to a method of determining a wave field in an anisotropic subsurface of the Earth. The method includes numerically solving a decoupled quasi-acoustic single wave mode wave equation based on spatially varied anisotropic parameters, to determine the wave field in the anisotropic subsurface.

5 Claims, 16 Drawing Sheets

(56) References Cited

OTHER PUBLICATIONS

Crampin, Stuart, "An introduction to wave propagation in anisotropic media", Geophys J. R. astr Soc., 1984, vol. 76, pp. 17-28.
Liu et al., "Decoupled Wave Equations for P and SV Waves in an Acoustic VTI Media", SEG Houston 2009 International Exposition and Annual Meeting, Jan. 1, 2009, XP-055143564, pp. 2844-2848.
Yan et al., "Elastic Wave-Mode Separation for VTI Media," Geophysics, vol. 74, No. 5, Sep.-Oct. 2009, pp. WB19-WB32.
Zhan et al., "Decoupled equations for reverse time migration in tilted transversely isotropic media," Geophysics, vol. 77, No. 2, Mar.-Apr. 2012, (Downloaded Jan. 29, 2018 to 91.208.124.2), pp. T37-T45.
Zhou et al., "An Anisotropic Acoustic Wave Equation for VTI Media", H033, EAGE 68th Conference & Exhibition—Vienna, Austria, Jun. 12-15, 2006, XP-007915131, pp. 1-5.
U.S. Appl. No. 15/110,585, filed Jul. 8, 2016.

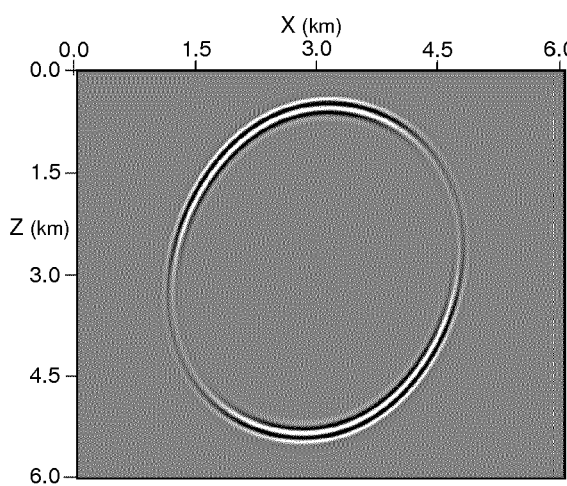 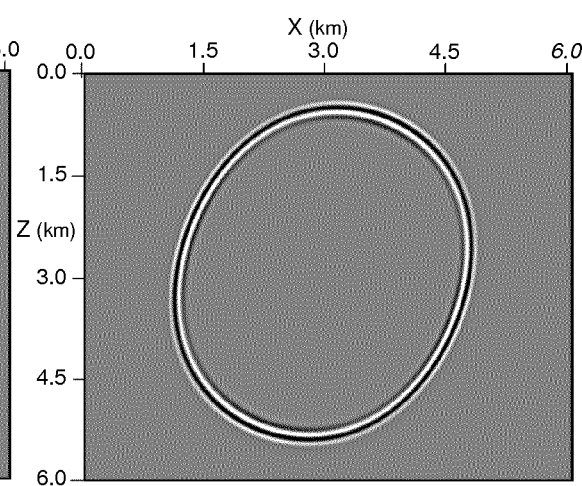
Figure 15a                    Figure 15b

DETERMINING A COMPONENT OF A WAVE FIELD

CROSS REFERENCE TO RELATED APPLICATIONS

This application is a Continuation of copending application Ser. No. 15/110,585, filed on Jul. 8, 2016, which is the National Phase under 35 U.S.C. § 371 of International Application No. PCT/EP2015/050352, filed on Jan. 9, 2015, which claims the benefit under 35 U.S.C. § 119(a) to Patent Application No. PCT/EP2014/050423, filed in the European Patent Office on Jan. 10, 2014, all of which are hereby expressly incorporated by reference into the present application.

TECHNICAL FIELD

The present invention relates to determining a wave field or a component of a wave field in the Earth's subsurface, in particular an anisotropic subsurface.

BACKGROUND

Propagation of a wave through a medium can be described by a "wave equation." The wave equation can typically be solved to determine the magnitude or other property of the wave as a function of time and space.

Geophysical surveys may be performed to explore the subsurface of the Earth. For example, seismic or electromagnetic surveys may be performed where an acoustic or electromagnetic (EM) wave is transmitted from a source into the subsurface and detectors are used to detect a response. Based on the detected response, properties of the earth may be determined. For example, the response may comprise time-series data with features associated with interfaces in the subsurface.

In seismic reflection surveying, high amplitude events in seismic data may be related to interfaces across which rock properties change abruptly and reflect a significant amount of energy back to the detectors. Therefore the high amplitudes in the data may be indicative of subsurface interfaces.

In typical processing of seismic data, the time between the transmission of the seismic wave and the detection of the high-amplitude event is often regarded to be the travel time of a seismic wave to the interface and back due to a reflection at the midpoint between source and receiver. Travel time is therefore typically considered a proxy for depth, and plotting of seismic data as a function of travel time may therefore indicate the depth relationship of amplitude features and hence subsurface interfaces.

In reality however, the seismic velocity of the subsurface layers through which the wave has passed is not constant (typically increases with depth), and therefore in order to obtain a more realistic impression of the location of interfaces, the data are depth converted, i.e. plotted as a function of depth, based on a pre-determined velocity profile or velocity model.

Data for source-receiver pairs are plotted at a mid-point therebetween. The data from all such pairs can therefore appear in a time or depth record at that midpoint, with amplitude events appearing as though they derive from a normal incidence source-receiver arrangement. Whilst this can give a suitable representation of the Earth's structure where layers are horizontal and planar, it will be appreciated that a seismic wave may be refracted along its propagation path, be reflected from sloping interfaces and interact with different layers in the incident and reflected directions. Therefore, the travel time data and depth converted data records may suggest a false geometry. For example, a high amplitude event may occur in the data at a particular depth position where there is in reality no reflector at that depth position.

This is a known issue in seismic data processing and in the interpretation of seismic reflection data, particularly in geologically complex structures. Correction of the data may be attempted by a process of migration. Seismic migration serves to reposition seismic data to their representative, geometrically faithful, positions in the data set. Migration algorithms have been developed for migrating seismic data. It is useful to understand the wave propagation of the seismic wave through the subsurface in order to perform migration. In simple terms, by tracing the route that the wave has taken from the source to the reflector and back to the surface, it is possible to identify the receivers at which the energy associated with that reflector has arrived and the time of arrival of that energy. In order to do this, a velocity model of the subsurface is required. This may be obtained from a model building package and may be based on well data or obtained in other ways, for example estimated, perhaps based on regional geological knowledge.

A further complicating factor is anisotropy of the subsurface. For example, particular rock types may have a strong directionality of propagation. The seismic velocity in different (e.g. orthogonal) directions may be significantly different, and may differ between layers.

Full wave-field migration techniques have been developed to model the development of the wave in time and at closely spaced positions spatially in 3D across a region of the subsurface. Such techniques may involve solving a wave equation of the kind mentioned above, to obtain the wave field at the different locations, with respect to time relative to a source signal emission at different locations.

These migration algorithms have as an input standard seismic data. The seismic data could be organized as common shot gathers, or in some other domain, such as plane wave or delayed shot domains. The seismic data may be provided in a transformed domain (compared to the originally acquired seismic data), for example a combined domain of linear phase for shot location for delayed shot migration, in which the combination of the data is performed by tau-p transform to the shot location. The tau-p transform may also be performed for receiver location to perform a plane wave migration. The wavefield solution of the wave equation provides a set of complex values at each target location/point, providing for example amplitude, phase, wave number, etc. These value are a crucial input components for the migration algorithms.

Many different wave equation techniques have been developed, and it is of interest to develop a wave equation technique for use in seismic migration in the case of an anisotropic subsurface. Some known migration techniques are now described in more detail.

Nowadays, accurate seismic anisotropic models are recognized as key points in imaging deep challenge areas for complex structures, because they describe the discrepancy of directional propagation speed of seismic waves, which is much more realistic for overburden geological structure such as bedding sediments with fractures. The tilted transverse isotropic (TTI) or tilted orthorhombic anisotropy (TOA) are generally necessary for imaging such complicated anisotropic structures (Zhang and Zhang, 2008; Zhang and Zhang. 2011: Fowler and King, 2011). Given an accurate anisotropic model, migration algorithms are destined to provide the artifact-free subsurface images. This may require applications of least-squares migration algorithms (Lambare et al., 1992; Nemeth et al., 1999) and it may become even more complicated when working on imaging the elastic model (Jin et al., 1992). Current integral-based migration algorithms, such as Kirchhoff migrations, are known to be very effective as the ray tracing could be easily adapted to the anisotropic Eikonal equation (Han and Xu, 2012). These algorithms are developed applicable for a single mode of waves such as quasi-P wave, which allows the migration algorithms to be linearized so as to reduce computational cost. However, for wave-equation-based algorithms, an efficient and accurate simulation of a single mode wave, such as quasi-P or quasi-S wave, is essential to the development of successful migration algorithms, such as reverse time migration (RTM) (Baysal et al., 1983; McMechan, 1983; Whitmore, 1983).

Historically, there are different ways for numerical simulation of single mode of waves. First of these is to solve the full elastic wave equations and then to split the wavefields to separate out the quasi-P wave for further analysis. The wavefield separation may be effective for the isotropic case (Sun et al., 2004), but it is not an easy task for heterogeneous anisotropic cases and might be extremely computationally inefficient (Yan and Sava, 2009; Cheng and Fomel, 2013).

Another way to reduce the computational cost while still maintaining the transverse isotropic (TI) anisotropic wave propagation is to apply an acoustic approximation (Alkhalifah, 2000) to the TI equation by setting the shear wave velocity along the symmetry axis to zero. This leads to a scalar fourth-order differential equation. However, Alkhalifah (2000) does not propose any workable numerical technique for obtaining the wave field from this fourth-order differential equation. Zhou et al. (2006) decompose this fourth-order differential equation into a coupled system of 2×2 second-order differential equations. This results in a more computationally efficient scheme than the original elastic equations. However, applications to the TTI media with variable TTI symmetric axis, especially with existence of abrupt changes on the TTI symmetric axis, demonstrate that this system is not numerically stable: the weak instabilities arise and the noises grow linearly in time (Liu et al., 2009. Zhang et al., 2011). These instabilities have been well analyzed and solutions have been proposed (Bakker and Duveneck, 2011; Zhang et al., 2011, Bube et al., 2012). Although the instabilities could be resolved, setting zero the shear wave velocity along the symmetry axis doesn't rule out the existence of the pseudo-shear waves, which are the intrinsic solutions of this couple system. People have tried various ways to attenuate them (Zhang et al., 2009; Guan et al. 2011); or simply ignore the presence of these shear wave artifacts as current industry practices of TTI RTM, with the expectation that they would be canceled out by imaging conditions and migration stack.

Another way is to compute directly the decoupled quasi-acoustic P wave equation. Given constant anisotropic parameters ε and δ, the decoupled equation could be solved with pseudo-spectral algorithm (Etgen and Brandsberg-Dahl, 2009). Therefore, it allows us to take a set of solutions of different constant ε and δ, proceeding with an interpolation scheme, to numerically solve the quasi-P wave with anisotropic parameters that are mildly changing in spatial domain (Chu et al. 2013). For VTI (transverse isotropic with a vertical symmetry axis) media, the interpolation scheme is two dimensional with respect to ε and δ. But for TTI media, if the symmetrical axis also varies spatially, two additional dimensions are necessary for the interpolation. This pseudo-spectral plus Interpolation method may need to compute a huge set of combination of anisotropic parameters and can be very inefficient when it is applied to a very complicated model. When the complexities of the anisotropic model are mild, the decoupled equation may be solved by approximately optimized separable method (Liu et al., 2009), which can be considered as a special case of low rank approximation (Fomel et al., 2012). The computational cost may be lower than pseudo-spectral plus interpolation method, but still very inefficient and inaccurate.

SUMMARY OF THE INVENTION

Various aspects of the invention are provided as set out in the claims appended hereto.

Any aspect may have further features as described in relation to any other aspect and features between aspects may be combined and interchanged, Embodiments of the invention provide, advantageously, techniques for numerically calculating the wave field of a wave propagating in an anisotropic medium. In particular, the techniques are advantageous in terms of reduced numerical or computational cost and simplicity of implementation.

Existing technology typically uses coupled equation systems which describe wave propagation and provide wave field solutions for several wave modes together. Typically, coupled systems for the quasi-P wave and quasi-S modes are used. Such a system has, intrinsically, two eigenvalues associated with the quasi-P wave and quasi-S wave modes respectively. In existing coupled equation techniques, artifacts and noise in the wave field solutions are found to appear due to the inclusion of the quasi-S wave mode. Coupled equation solutions have generally high numerical cost. Techniques for numerically calculating the wave field of a seismic wave propagating in anisotropic regions of the earth have been lacking.

DESCRIPTION AND DRAWINGS

There will now be described, by way of example only, embodiments of the invention with reference to the accompanying drawings, in which.

Figure 10:
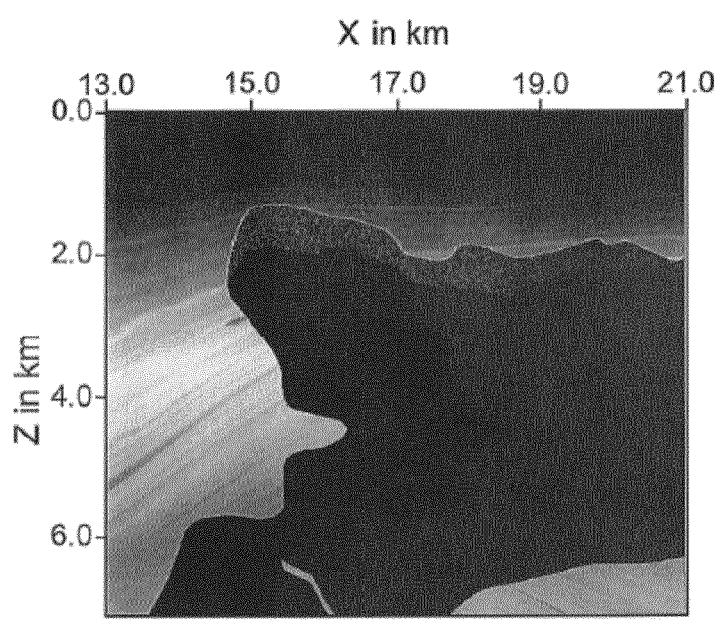
FIG. 10 is a contour plot of the velocity model for a SEAM TTI salt model.
Figure 11:
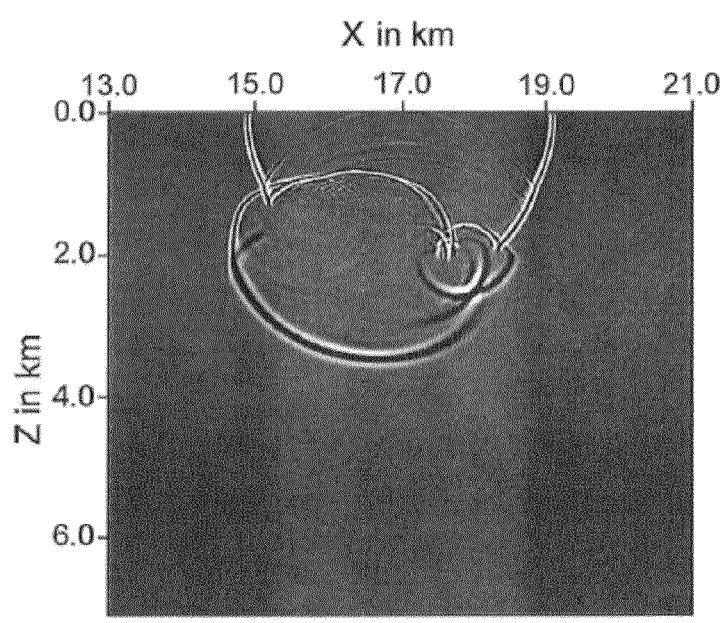
Figure 12:
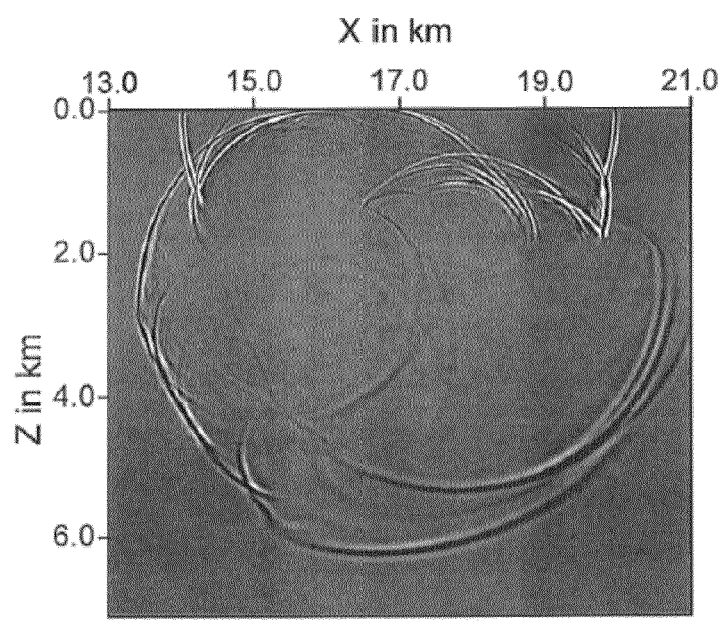
Figure 13:
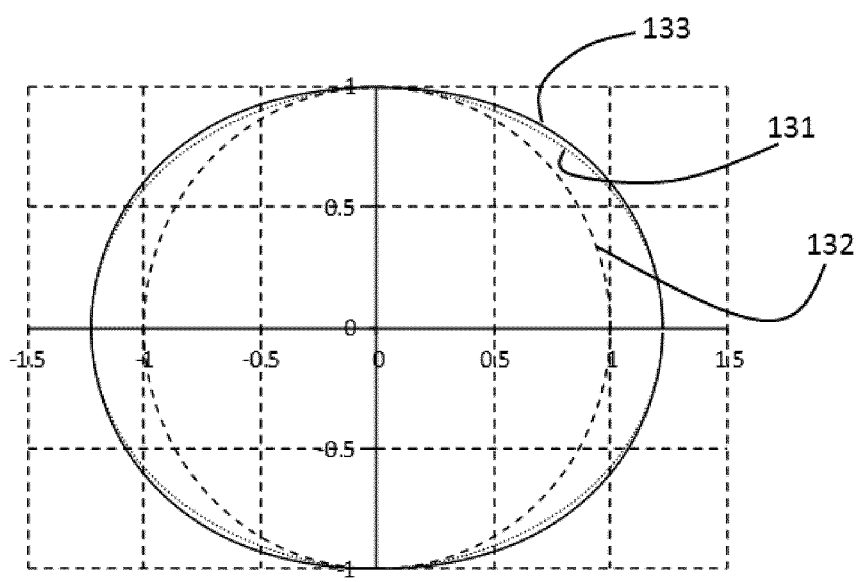
Figure 14:
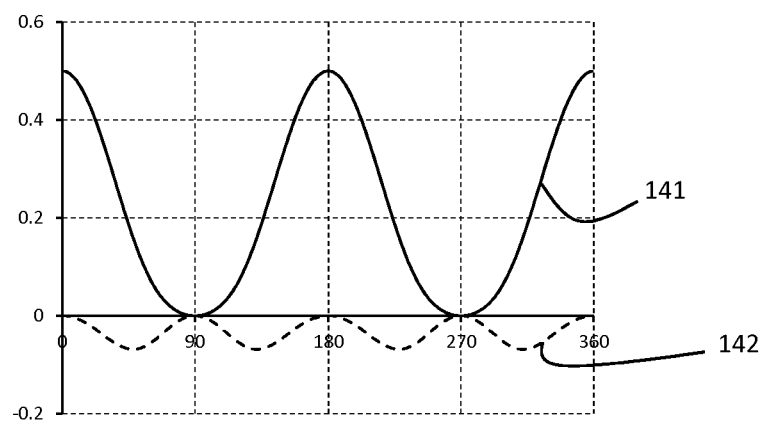
Figure 16:
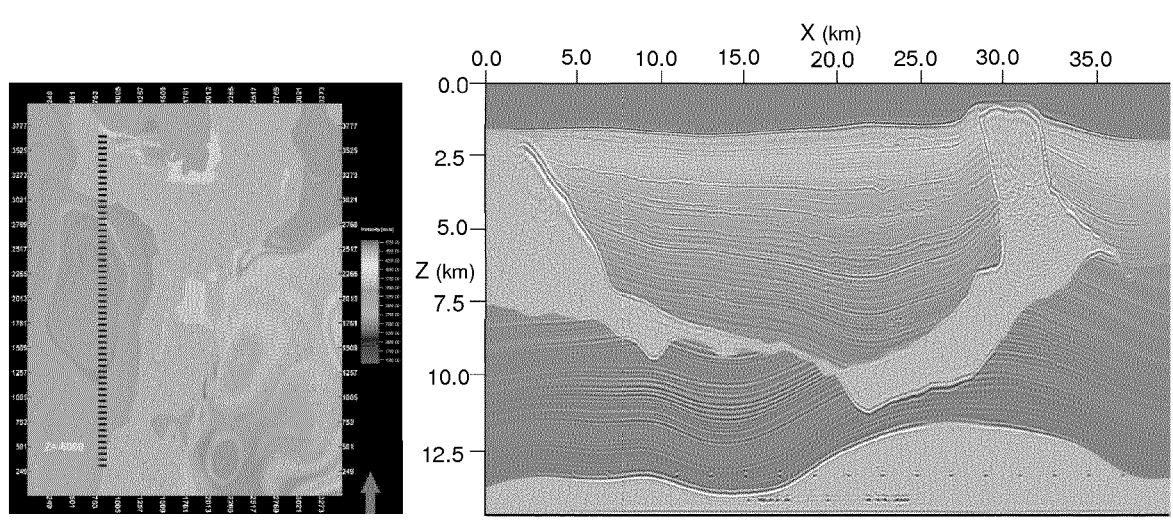

FIG. 11 is a contour plot of wave field magnitudes for the model of FIG. 10 at time t=1.6 s, FIG. 12 is a contour plot of wave field magnitudes for the model of FIG. 10 at time t=2.4 s, FIG. 13 illustrates three dispersion curves, FIG. 14 illustrates the amplitude of asymptotic correction terms, FIG. 15 illustrates two wave fields, and FIG. 16 illustrates a calculation carried out with an elliptical model.

WAVE EQUATION MODEL

We first propose a pure cinematically-accurate quasi-P wave equation for complex anisotropic models. This equation is obtained by decomposing the original pseudo-differential operator of Alkhalifah (2000) Into two numerical solvable terms: a differential operator and a scalar operator. The resulted new quasi-P wave equation has separated the anisotropic model parameters from the spatial pseudo-differential operator and hence can be solved with traditional numerical schemes without sacrificing its accuracy, i.e., no approximations have been applied and therefore it maintains the same dispersion relation as that of the original pseudo-differential wave equation. The differential operators in the equation are designed to be self-adjoint and therefore can conserve the energy when the wave propagates. Then, we discuss a numerical implementation of the proposed algorithm. The proposed quasi-P wave equation has a similar form to an acoustic wave equation and can be implemented similarly, In our current implementation, we use pseudo-spectral algorithm for the spatial derivatives and second-order accuracy finite-difference scheme for the time derivative. Extensions of the new algorithm to TTI and TOA media are straightforward and have been briefly mentioned in the texts.

We validate our approach with examples of the impulse responses of the VTI/TTI models and illustrate the functionalities of the terms in the new pure quasi-P wave equation. Finally, we demonstrate the effectiveness and robustness of our quasi-P equation with an example of the quasi P wave propagations in a SEAM TTI salt model.

Decomposition of Pseudo-Differential Operator

In the following, for simplicity we will work on the VTI case first. This requires us to solve the following scalar pseudo-differential equation (Alkhalifah, 2000):

$$\frac{\partial^2 u}{\partial t^2} - \frac{v_0^2}{2}\left(\frac{\partial^2}{\partial h^2}(1+2\varepsilon) + \frac{\partial^2}{\partial z^2} + \sqrt{\left(\frac{\partial^2}{\partial h^2} + (1+2\varepsilon) + \frac{\partial^2}{\partial z^2}\right)^2 - 8(\varepsilon-\delta)\frac{\partial^2}{\partial h^2}\frac{\partial^2}{\partial z^2}}\right)u = 0. \tag{1}$$

Where $$\frac{\partial^2}{\partial h^2} = \frac{\partial^2}{\partial x^2} + \frac{\partial^2}{\partial y^2}$$

is the horizontal Laplaclan operator; $v_0$ is the velocity along the symmetry axis; $\varepsilon$ and $\delta$ are the Thomsen (1986) anisotropic parameters, as defined in Thomsen (1986). The definitions of these parameters as provided in Thomsen (1986; see Reference section below) are incorporated in the present disclosure by reference. Note all of these parameters are spatially-varied. Eq. 1 governs the quasi-P wave propagation, although the amplitude of its solution might be quite different from a real elastic quasi-P wave. This is because of the decoupling of full elastic equations after which all the interaction of different wave modes are omitted, including the conversion to and from other wave modes. However, eq. 1 shares the same dispersion to that of elastic quasi-P wave, indicating that its phase is accurate comparing with the elastic quasi-P wave. Although eq. 1 is very promising for single-mode wave propagation, unfortunately, it represents a pseudo-differential operator equation that cannot be solved with traditional finite difference numerical schemes. Alkhalifah (2000) does not numerically solve the equation 1 in complex media.

The formulation of this pseudo differential operator suggests a numerical solution in which the spatial gradient components of the current wave field are determined first, forming the combination of the gradient components inside the square root, and then taking the square root of that combination. This does not work in traditional schemes. We re-write the equation, and replace the pseudo-differential operator with two operators which are not any more pseudo-differential operators.

In order to describe our approach, we start with its corresponding dispersion relation of eq. 1, which is represented as follows:

$$\left(\omega^2 - \frac{v_0^2}{2}\left(k_k^2(1+2\varepsilon) + k_z^2 + \sqrt{(k_k^2(1+2\varepsilon) + k_z^2)^2 - 8(\varepsilon-\delta)k_k^2 k_z^2}\right)\right)u = 0. \tag{3}$$

Here $\omega$ is the angular frequency. The spatial wavenumber vector $\vec{k}$ are as usual defined as $\vec{k}=(k_x,k_y,k_z)$. Therefore, $k_x$ is the horizontal wave number with $k_h^2=k_x^2+k_y^2$, $k_z$ is the vertical wave number. Eq. 2 can also be rewritten as:

$$\left(\omega^2 - \frac{v_0^2 \vec{k}^2}{2}\left(n_k^2(1+2\varepsilon) + n_z^2 + \sqrt{(n_k^2(1+2\varepsilon) + n_z^2)^2 - 8(\varepsilon-\delta)n_k^2 n_z^2}\right)\right)u = 0, \tag{3}$$

in which $\vec{n}=(n_x,n_y,n_z)$ is the unit vector of phase direction and is defined as $$\vec{n} = \frac{\vec{k}}{|\vec{k}|}. \tag{4}$$

Let's define an auxiliary scalar operator S as $$S = \tfrac{1}{2}(n_k^2(1+2\varepsilon)+n_z^2+\sqrt{(n_k^2(1+2\varepsilon)+n_z^2)2-8(\varepsilon-\delta)n_k^2 n_z^2}). \tag{5}$$

Now, eq. 3 becomes $$(\omega^2 - v_0^2 \vec{k}^2 S)u = 0 \tag{6}$$

In space domain, the operator $-\vec{k}^2$ is expressed as $\nabla \bullet \nabla$ where symbol $\nabla \bullet$ denotes divergence, and V denotes gradient. Transforming Eq.6 from frequency-wavenumber domain back to time-space domain results in the following equation:

$$\frac{\partial^2 u}{\partial t^2} - \nabla \cdot (v_0^2 S \nabla u) = 0. \quad (7)$$

This equation represents the corresponding partial differential equations of eq. 6 in time-space domain. This defines a model for quasi P-wave propagation in an anisotropic medium, such as in the Earth's subsurface, solvable with easy to implement and efficient numerical methods to provide a wave field in space and time. It is not a pseudo-differential equation anymore because we have separated out the anisotropic terms from the derivatives. But this equation is a nonlinear wave equation since the scalar operator S depends also on the solution of the wavefields. This scalar operator can be calculated in the space domain as the vector $\vec{n}$ has its physical meaning: phase direction of the wavefront. Because eq. 5 is not sensitive to the sign of components of $\vec{n}$ (since all components have even number of powers), we could just use the components of $$\frac{\nabla u}{|\nabla u|}$$

to replace the components of $\vec{n}$ in eq. 5. The scalar operator S is crucial in our approach; it actually plays the role of the dispersion relation for the whole wave propagation. It controls the propagation speed of quasi-P wave (an anisotropic propagation operator), it depends not only on the phase direction of the propagation at each spatial point, but also on the anisotropic parameters at each individual spatial location. And the computation of this operator needs only the anisotropic parameter which is varied spatially, and the gradient of the current wave field.

It can be noted that wave propagation is calculated in time steps. In order to compute the next time step of the wavefield, the current wavefield is needed. A starting wave field is defined, providing a boundary condition or starting point for the calculations. A predefined source wavelet emitted at a source location can be defined and used to allow this starting wave field to be determined.

The velocity model is pre-determined, e.g. estimated by other algorithms and/or provided in a model building package. The model building package can include many algorithms such as tomography inversion, full wave inversion, salt interpretation, etc. The velocity is a required input and supposed to be known for migration algorithms. The anisotropy parameters are parts of the model for wave propagation (input), and also contained in the velocity model. They could be estimated by the model building package.

The differential operator in eq. 7 is a self-adjoint operator and therefore conserves the energy. This should guarantee the stability of the wave propagations even for the cases with abrupt spatial changes of the model and anisotropic parameters.

The generalization from VTI to TTI or TOA is very simple in our approach. For TTI we need just to project the gradient vector of wavefield $\nabla u$ to the local coordinates, in which the local z axis is the symmetrical axis of anisotropy, and then apply exactly the same procedure to eq. 5. Similar analysis can be generalized to TOA media.

An alternative solution from eq. 6 can be implemented with its equation described as follows:

$$\frac{\partial^2 u}{\partial t^2} - v_0^2 S \nabla^2 u = 0 \quad (8)$$

Here, the pseudo-differential operator in eq. 1 is decomposed into two operators: a scalar operator and a Laplacian operator. This equation uses directly the Laplacian operator and has a form similar to an acoustic wave equation.

Decomposition into Spherical Terms

The numerical calculation of scalar operator S in the wavenumber domain requires the anisotropic parameters in equation 7 to be constant, and may therefore be calculated in the space domain with the phase direction approximated asymptotically:

$$\vec{n} = \nabla u / |\nabla u|.$$

To analyse theoretically the effect of the asymptotic approximation term, we rewrite the scalar operator in equation 7 as:

$$S = 1 + \Delta S, \ \Delta S = \frac{1}{2}(\sqrt{n_h^2(1+2\varepsilon)+b_z^2)^2 - 8(\varepsilon-\delta)h_n^2 n_z^2 + 2\varepsilon n_h^2} - 1) \quad (9)$$

Using this expression for the scalar operator, the wave equation becomes $$\frac{\partial^2 u}{\partial t^2} = v_0^2 \nabla^2 u + v_0^2 \nabla \cdot (\Delta S \nabla u). \quad (10)$$

The first term of right hand side in equation 10 is the background wave equation. It may be considered as a differential operator—the Laplacian operator, which does not contain an approximation. The second term on the right hand side of equation 10 can be considered as a correction term. The calculation of $\Delta S$ depends on the wave propagation directions, which is an asymptotic approximation. Equation 10 may be considered as a spherical decomposition of the original wave equation 1.

In FIG. 13, dispersion curve 131 corresponds to a solution of equation 1, dispersion curve 132 is a background dispersion curve corresponding the first term of the right hand side of equation 10. Dispersion curve 133 will be discussed in relation to an elliptical model below. The background dispersion 132 is illustrated for constant anisotropic parameters ε=0.25 and δ=0.1. The asymptotic correction is intended to correct the phase from curve 132 to curve 131.

In FIG. 14, curve 141 shows the magnitude of the asymptotic correction $\Delta S$ between the angles 0-360°. It is noted that the correction is relatively large compared to the background dispersion: for this example, the maximum correction is about 50% of the background dispersion. Therefore, this approach requires very accurate estimation of direction of the wavefield. Lateral spatial sampling of computations larger than the Nyquist sampling may be used. Therefore, the high wavenumber part of the wavefields is aliased and might introduce errors in the calculation of the direction vector in lower wavenumber range of wavefields, which makes this approach vulnerable to the direction errors.

Decomposition into Elliptical Terms

In order to enhance the tolerance of the numerical errors of the directional vector in the algorithm, we propose, instead of a spherical decomposition, an elliptic decomposition as defined in equation 11 below. In this equation, we still decompose the pseudo-differential operator into two operators: a differential operator and a scalar operator.

However, the Laplacian operator in the original decomposition is replaced with an elliptic differential operator, while the scalar operator is also correspondingly modified to ensure the accurate phase of wave propagation. The purpose of the new decomposition is to reduce the magnitude of asymptotic term. This decomposition is:

$$\frac{\partial^2 u}{\partial t^2} = \left(v_0^2 \frac{\partial^2 u}{\partial z^2} + (1+2\varepsilon)v_0^2 \frac{\partial^2 u}{\partial x^2}\right) S_e, \quad (11)$$

$$S_e = \frac{1}{2}\left(1 + \sqrt{1 - \frac{8(\varepsilon-\delta)n_x^2 n_z^2}{((1+2\varepsilon)n_x^2 + n_z^2)^2}}\right)$$

In which $S_o$ is the elliptic scalar. The term $$\left(v_0^2 \frac{\partial^2 u}{\partial z^2} + (1+2\varepsilon)v_0^2 \frac{\partial^2 u}{\partial x^2}\right)$$

may be written as $$\left(v_0^2 \frac{\partial^2}{\partial z^2} + (1+2\varepsilon)v_0^2 \frac{\partial^2}{\partial x^2}\right) u,$$

and interpreted as a differential operator times u and this differential operator (the term within the large brackets) is an elliptic differential operator. To further analyse the asymptotic term in equation 5, we rewrite it explicitly as (equation 12):

$$\frac{\partial^2 u}{\partial t^2} = v_0^2 \frac{\partial^2 u}{\partial z^2} + (1+2\varepsilon)v_0^2 \frac{\partial^2 u}{\partial x^2} + \left(v_0^2 \frac{\partial^2 u}{\partial z^2} + (1+2\varepsilon)v_0^2 \frac{\partial^2 u}{\partial x^2}\right)\Delta S_e,$$

$$\Delta S_e = \frac{1}{2}\left(\sqrt{1 - \frac{8(\varepsilon-\delta)n_x^2 n_z^2}{((1+2\varepsilon)n_x^2 + n_z^2)^2}} - 1\right)$$

FIG. 13 shows the comparisons of the of the dispersion curves between the spherical approach and the elliptical approach. For constant anisotropic parameters ε=0.25 and δ=0.1, curve 133 shows the dispersion curve of the first term of the right hand side of equation 12. Comparing this curve with the spherical decomposition approach, we note that the elliptic decomposition background is much closer to the desired exact solution illustrated as curve 131. In FIG. 14, the line 142 shows the magnitude of the asymptotic correction $\Delta S_e$ in 0~360°. The maximum magnitude of $\Delta S_e$ is 0.068, which is 7 times smaller than the spherical decomposition. Therefore, the elliptic decomposition has much better tolerance to the direction errors.

First, we demonstrate the effects of this algorithm with an example of a simple impulse in FIG. 15. This example is a simple TTI (tilted transversely isotropic) model, which Is homogeneous with the vertical velocity defined as 2000 m/s and the Thomsen (1986) anisotropic parameters as ε=0.24 and δ=0.1 with a tilted angle of 30° and an azimuth angle of 135°. The source wavelet for this example is a Ricker wavelet with a maximum frequency of 24 Hz. The computing grid is a 3D cube with lengths of 6.0 km and the spatial sampling as 15 m in all 3 directions. The point source is put in the middle of the grid. FIG. 15a) plots a 2D seismic slice, located at middle of the Y direction, of the 3D wavefield snapshot at time t=1.0 s from spherical decomposition approach; and FIG. 15b) plots the same with elliptic decomposition approach. Both approaches generate only pseudo-P wave and no shear wave exists. Both wavefields yield the same propagation phase, but the elliptic decomposition approach gives a more balanced amplitude. We further note that the numerical costs for spherical decomposition and for elliptic decomposition are almost identical.

The second example is a migration test with SEG SEAM model. We selected a shot line for this test FIG. 16, the left hand side, illustrates the location of this shot line, which contains 342 shots. We build a TTI RTM with the proposed pure quasi-P wave equation and migrated these shots. FIG. 16, the right hand side, shows the image result by using the elliptical algorithm disclosed herein, which overlays with the density model. It is clear that the image generated with the new quasi-p wave equation matches the density model very well and presents clean and accurate result.

Numerical Method

Equation 7 is solved numerically to obtain wave field components for each predefined location within the subsurface at different wave propagation times. This is done by a numerical estimation process. The numerical process to solve Equation 7 is relatively straightforward to implement. The numerical solution of equations 10 and 11 is similar, but the value of the scalars will be different because the differential operator is different when compared to equation 7. The process has the steps $1 to 83 for determining the wave field, as set out below and illustrated in FIG. 1:

S1. Compute the gradient of the current wave field. The current wave field is for example the wave field determined for a previous time step. This is initially the wave field at a boundary time zero.

S2. Compute the scalar operator S. This is done as indicated in eq. 5. The operator S is computed at each spatial location by using the gradient field from step S1 to obtain the phase direction components (ignoring the sign after projection to local coordinate). Multiply the scalar operator and the square of the velocity with the gradient of wavefield. These are all numerical values.

S3. Compute the divergence of the result from step 2, to determine the wave field at the given time step. A value of the rate of change in time from the current wave field is obtained, which in turn is used to give the field at the new time typically by using an integral method.

Figure 1:
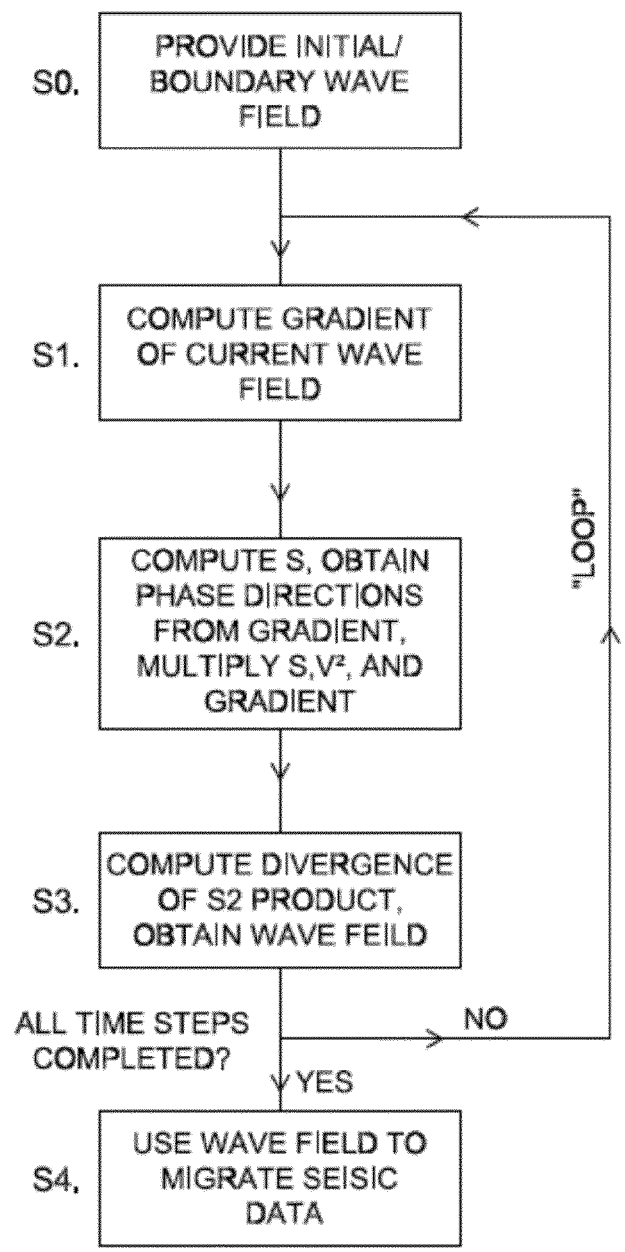
FIG. 1 is a flow chart representation of a method of determining a wave field according to an embodiment of the invention.

The determined wave field of step S3 is used as the current wave field in step S1 of the following propagation time step, as indicated by the loop in FIG. 1. The steps S1 to S3 are repeated at successive steps of propagation time, so that an accurate wave field with respect to time and space can be determined.

As seen in FIG. 1, an initial step S0 in the process may be present for the provision of the initial wave field. A further step S4 is also shown in FIG. 1, whereby the determined wave field is used to migrate seismic data. This is done once the calculation of the wave field at each spatial location for all of the time steps has been completed. Standard migration algorithms are arranged to use the wave field or components thereof. The appropriate wave field for a desired travel time and location of interest in the subsurface can be obtained from the solution method above.

Similarly. Equation 8 can be solved by a numerical estimation process with steps T1 and T2 as follows:

T1. Compute the gradient of the current wave field. The current wave field is for example the wave field determined for a previous time step. This is initially the wave field at the boundary at time zero, T2. Compute the scalar operator S as seen in eq 5 for each spatial location by using the gradient field from step T1 to obtain the phase direction components (ignoring the sign after projection to local coordinate). Multiply the scalar operator and the square of the velocity with the Laplacian gradient of the wavefield. A value of the rate of change in time is obtained, which in turn is used to give the field at the new time typically by using an integral method.

The gradient calculations within the relevant steps S1 to S3 or T1 to T2 of the above methods can be performed using standard finite difference algorithms, or alternatively, using standard Fast-Fourier Transform (FFT) methods.

The determination of the wave field when using the finite difference numerical technique costs at most twice as much as that using the standard isotropic acoustic wave equation solution. This is much faster than other approaches in anisotropic wave propagation.

In order to obtain the gradient and divergence in the steps S1 to S3 above, first derivatives (del and divergence) of the wave field need to be calculated, and an optimized numerical scheme could be used to calculate these simultaneously, which can be efficient. Likewise, in order to obtain the Laplacian (del squared) in Equation 8, the first and second derivatives are needed and an optimized numerical scheme could be used where the first and second derivatives of the wave field could be calculated simultaneously and efficiently. For example, one may use the Fast Fourier Transform (FFT) to compute these spatial derivatives. In this case, it requires only one forward FFT and two inverse FFTs to obtain both first derivative and second derivative simultaneously. Again, standard FFT algorithms are suitable.

When using the FFT numerical technique determination of the wave field is performed at an additional numerical cost of just 50% more than the solution of the standard acoustic wave equation for an isotropic medium. We notice that the numerical cost increases minimally when moving from VTI to TTI or to TOA media.

Equation 8 uses the Laplacian operator directly. Therefore, an efficient numerical scheme could be an easier to implementation. Comparing to eq. 7, equation 8 has the same kinematic behaviour but different amplitude effects.

The integral method used to obtain the wave field in steps S3 or T2 can be a standard time integral numerical method, for example a second-order accuracy of finite-difference scheme of temporal integration or rapid expansion method (REM) (Kosloff et al., 1989).

In summary, the wave equation (equation 8) has the form $$\frac{\partial^2 u}{\partial t^2} = v_0^2 S \nabla^2 u.$$

Numerically, the wave field depends on spatial point X and time t, as could be expressed as U(x,t). The task to solve the wavefield involves using the wavefield at a current time sample to compute the wavefield of the next time sample. So, for the left hand of the equation (second derivative on time) the method we use can be a standard scheme which we refer to as the Integral method. For the calculation of this integral, we need know the value of right hand of the equation, which contains spatial derivative of the wavefields (first order in eq.7, and second on eq. 8). The conventional numerical schemes could be used for this purpose, which is Finite Difference (FD) or FFT (FD is more efficient, and FFT is more accurate), whilst it will be noted that in general both FD and FFT are standard and are in their own right well-understood algorithms.

Figure 2:
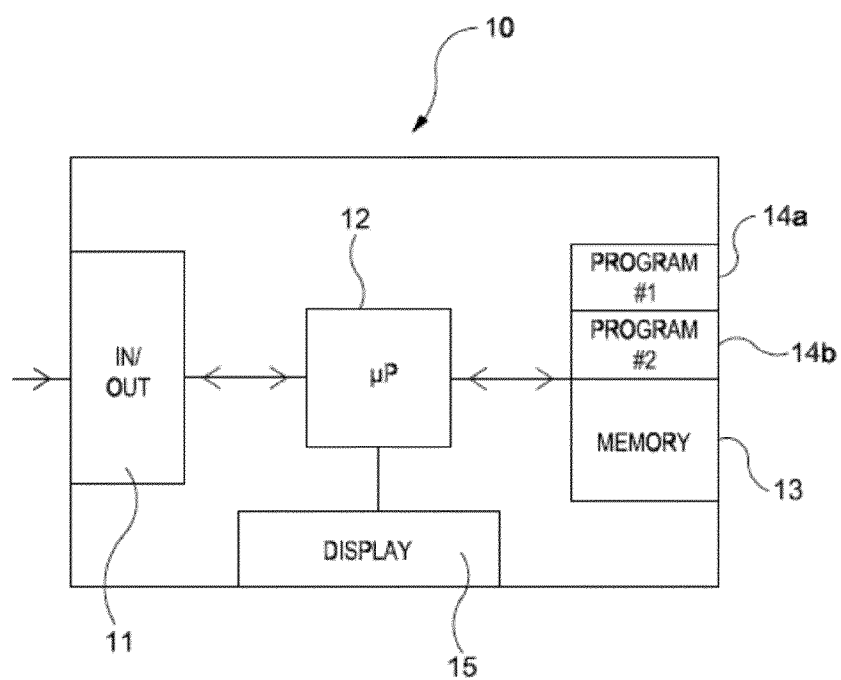
FIG. 2 is a schematic representation of a computer device for use in determining wave field according to an embodiment of the invention.

Turning now to FIG. 2, there is depicted a computer device for performing methods of determining the wave fields or components thereof, as set out above. The computer device 10 has an In/Out device 11, a microprocessor 12 and a memory 13. Computer programs 14a and 14b are stored in the memory 13. The wave field computer program 14a has instructions for performing the numerical methods for solving the Equations 7 and 8 to obtain the wave field at different propagation times and spatial locations. The microprocessor 12 is arranged to read and execute the instructions contained the wave field computer program to determine the wave field. The calculated wave field is preferably also stored in the memory, and is passed as input to a migration program also stored in the memory, also executable by the processor 12 so as to perform migration of seismic data using the calculated wave field. The device may also have a display for viewing data stored in memory and/or calculated via the programs. The migration may be performed as described above herein, including the background section.

The In/Out device 11 is used for reading in or outputting data from the computer device. In particular, seismic data can be received through the In/Out device, as may be obtained in a seismic survey, and such data stored in the memory 13.

Figure 3:
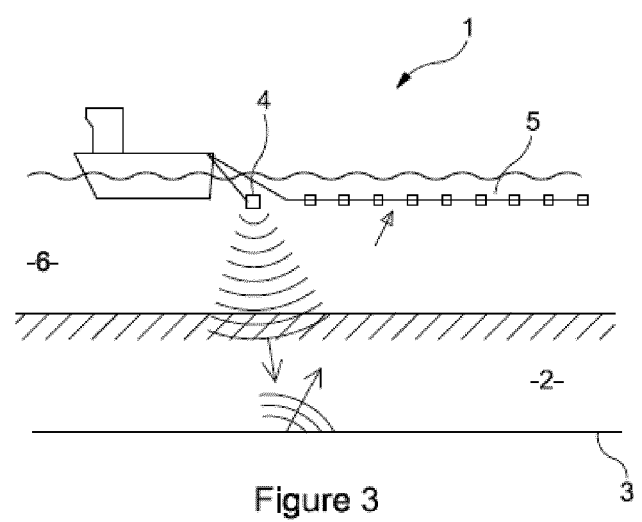
FIG. 3 is a schematic representation of apparatus for acquiring data.

In FIG. 3, apparatus is depicted comprising seismic survey apparatus 1. The apparatus includes a seismic survey vessel towing a seismic source 4 and seismic detectors 5 through a body of water. The seismic source is used to transmit a seismic wave through the subsurface 2. The wave interacts with an interface 3 and a portion of the energy is reflected back toward the detectors. The detectors are arranged to detect energy received at the detector. The detectors can typically be used to obtain data comprising records of amplitudes with respect to travel time relative to the source event which generates the seismic wave. High amplitude events may then be associated with reflections from interfaces in the subsurface. The data from the survey may be read by a computer device, and processed to provide an image of the subsurface to help reveal geological structure. For example, the apparatus may comprise a computer device described in FIG. 2, and the data from the survey may be ready by that computer device and processed using the processor. The data may be then be migrated to provide migrated seismic survey data reports or images, e.g. migrated seismic sections. Such a system may be applied to provide data as describe elsewhere above herein.

The computer device may be a distributed device in that any one or more of the In/Out device 11, microprocessor 12, memory 13 and display 15 can be distributed across different locations. Communication therebetween may take place as indicated, over a network, for example a wireless network.

The programs, wave field data and/or migrated data may in certain embodiments be stored on removable storage medium, such as a memory stick or compact disk, executable by the computer device and/or processor upon connection therewith. A signal may be provided that is communicated over the network containing the programs, machine readable instructions thereof, the wave field data and/or migrated data produced as described above.

The wave field solutions from the presently proposed wave equations 7 and 8 may be used in other applications which require use of a predicted wave field of a single mode of wave, e.g. seismic modelling, full waveform inversion, etc.

EXAMPLES AND RESULTS

Various tests of the wave equation models of Equations 7 and 8 described above have been performed, results of which are seen in FIGS. 4 to 12. In all the following examples, we apply a pseudo-spectral technique for spatial derivatives and finite-difference scheme with second-order accuracy for time derivative. That is, FFT is used for the spatial derivatives (due to the higher accuracy) whilst an integral method with a second order finite difference scheme is used for the time derivative.

The numerical grid size is chosen to avoid spatial dispersion, i.e., up to the Nyquist wavenumber, and propagation time step is chosen to satisfy stability condition.

Figure 4:
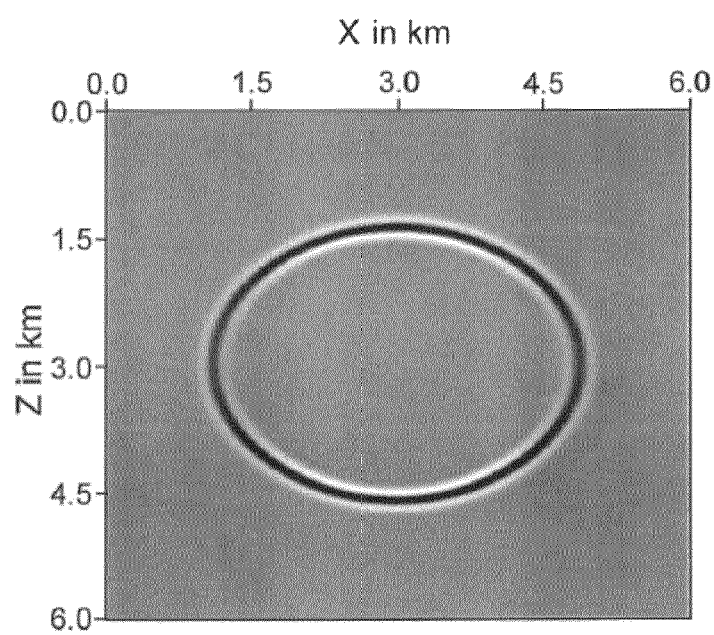
FIG. 4 is a contour plot of wave field magnitudes for a VTI model wave field solution.
Figure 5:
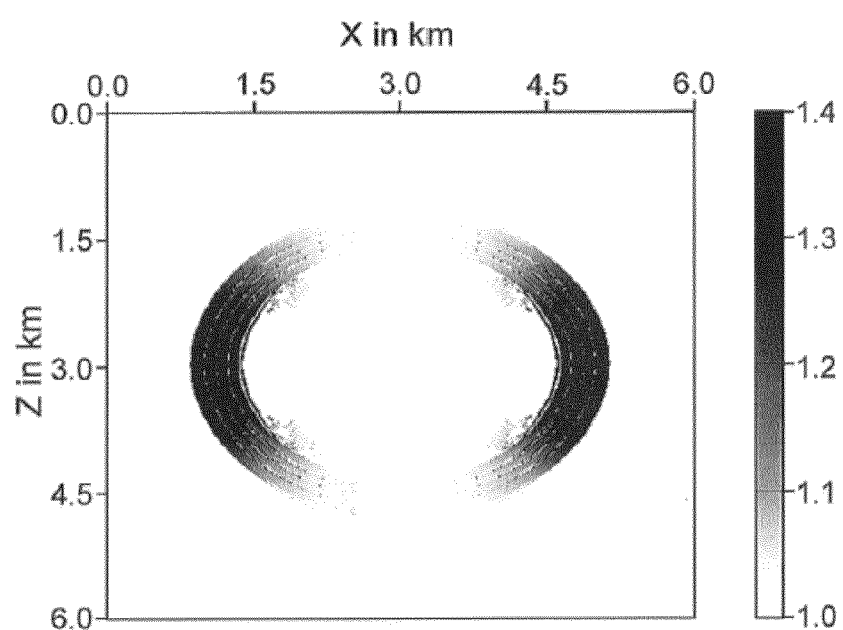
FIG. 5 is a contour plot of magnitudes of an operator used to calculate the model wave field of FIG. 4.
Figure 6:
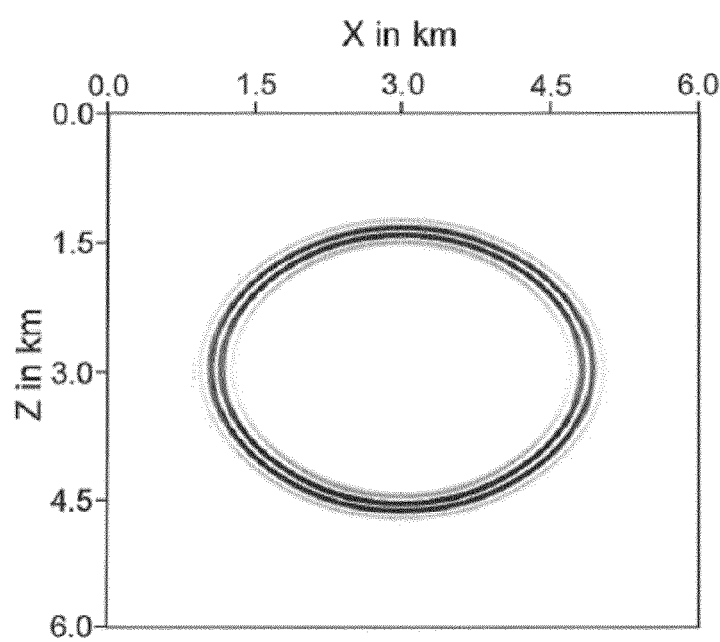
FIG. 6 is a contour plot of magnitudes of a composite operator S|∇u| in the wave field of FIGS. 4 and 5.

The first example is a simple VTI model, which is homogeneous with the vertical velocity defined as 2000 m/s and the Thomsen (1986) anisotropic parameters as $\epsilon=0.2$ and $\delta=0.1$. The source wavelet for this example is Ricker wavelet with maximum frequency of 24 Hz. The computing grid is a 3D cube with length of 6.0 km with the spatial sampling as 15 m in all 3 directions. The point source is put in the middle of the grid. FIG. 4 plots a 2D seismic slice, located at middle of the Y direction, of the 3D wavefield snapshot at time t=0.8 s. Obviously, only pseudo-P wave appears and there exists no shear wave. FIG. 5 shows the corresponding image of operator S at the same snapshot time. This operator plays a crucial role in our algorithm. We observe that the picture is not as smooth and clean as the wave field. This is because the propagation direction represented by $$\frac{\nabla u}{|\nabla u|}$$

loses its accuracy around the locations where the gradient function tends to zero. Fortunately, this lost accuracy can be brought back by the composite operator $S|\nabla u|$, which is the magnitude of the term inside the divergence operator before application of velocity model as defined in Equation 7. The combined effect of the product of two quantities $S|\nabla u|$ is shown in FIG. 6. The smooth and clean image demonstrates that the inaccuracy of the direction introduces little noticeable errors to the wavefield calculation.

Figure 7:
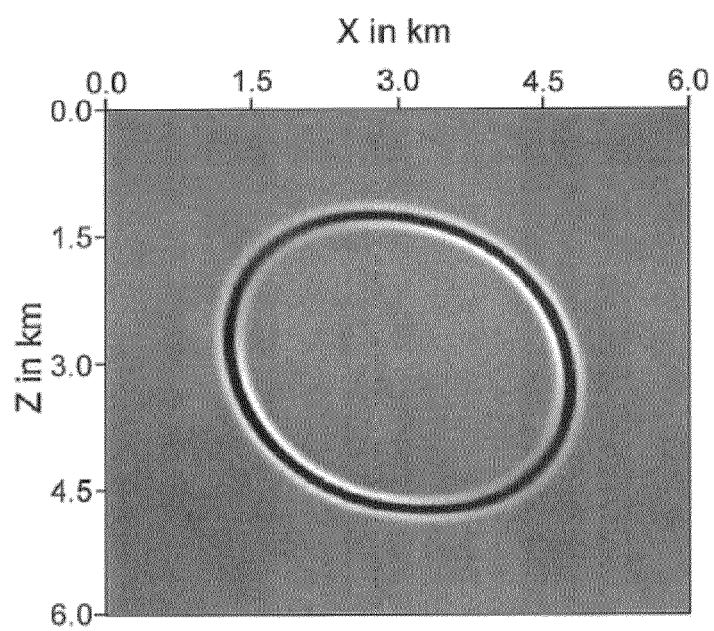
FIG. 7 is a contour plot of wave field magnitudes for a TTI model wave field solution.
Figure 8:
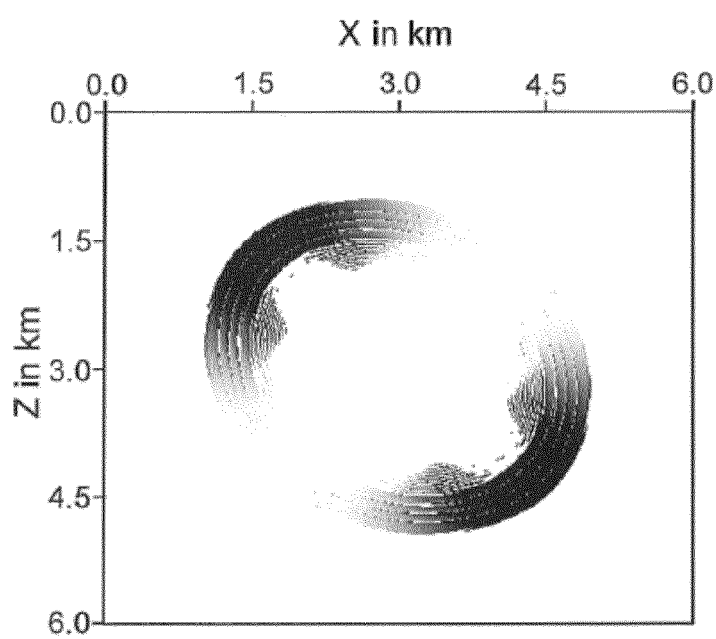
FIG. 8 is a contour plot of magnitudes of an operator used to calculate the model wave field of FIG. 7.
Figure 9:
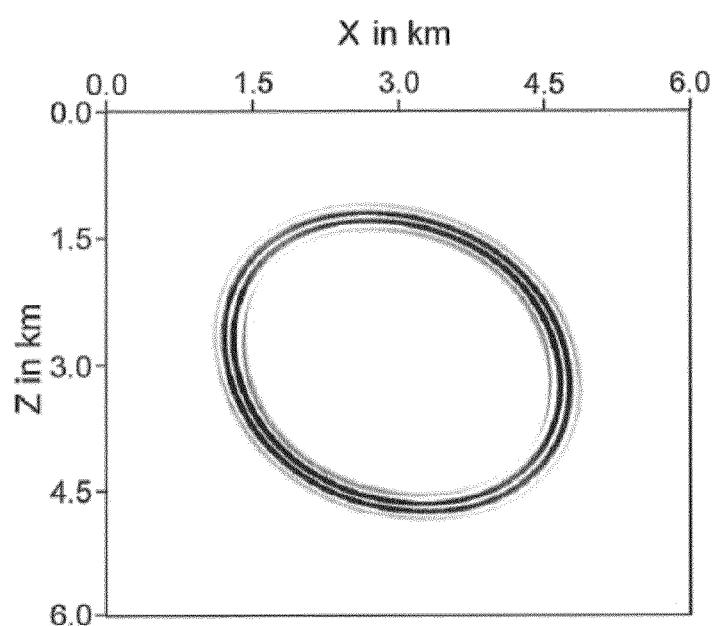
FIG. 9 is a contour plot of magnitudes of a composite operator S|∇u| in the wave field of FIGS. 7 and 8.

To validate our approach for a TTI case, we utilize the same computing parameters as that of the VTI model in the first example and extend it into a simple TTI model. Therefore, besides the same VTI anisotropic parameters, we introduce also the dip angle as 45° and the azimuth angle as 0°, i.e. the anisotropic symmetry axis is tilted, the tilt being defined by dip and azimuth angles (In the case of VTI, the symmetry axis is vertical (non-tilted)). FIG. 7 shows the 2D slice of snapshot wavefields at the same location and time slice as the first example. Note the rotations of the wavefront that is the result of TTI parameters. Similarly, FIG. 8 is the corresponding output of operator S. FIG. 9 plots the combined effects of the products of the two operators $S|\nabla u|$.

We have also tested our approach on a SEAM TTI salt model. The model dimensions are known to be: nx=ny=864 and nz=768. The grid sampling rate is 10 m in all three directions. We put the source location at the position of (x,y,z)=(17, 23.0, 0.0) km. We again use Ricker wavelet as the source wavelet but this time with a maximum frequency of 75 Hz. The propagation time step is 0.5 ms. FIG. 10 plots the centre line of the 3D velocity model; and FIG. 11 shows the centre inline slice of the 3D time snapshot at t=1.6 s, and FIG. 12 shows the time snapshot at t=2.4 s. Note that the propagator handles the complex wavefields very well. It generates the transmission waves, reflection waves, and head waves, but no shear-waves.

Advantages

Comparing with traditional wave equations, our approach has some obvious advantages. First is the simplicity of the equations 7 and 8. They keep the same form for VTI, TTI, and TOA. Second is the numerical efficiency. Comparing with the wave propagation in TTI medium, conventional schemes generally require 3-5 times more computer resources than that for simulations of isotropic waves while our proposed scheme only introduce 50% additional cost. This is a much more efficient scheme than existing ones. In addition its numerical performance is almost the same for transverse isotropy, tilted transverse isotropy, orthorhombic anisotropy, or tilted orthorhombic anisotropy. Third is the stability of the equation. Similar to the acoustic cases, the weak instabilities of TTI in conventional 2×2 second order differential equations system does not appear in our new equation. Our solution is numerically stable for very complicated models, e.g. model with complex salt structures and over-thrust structures with abrupt changes of anisotropic symmetry axis. Since only one differential equation is used, the new proposed scheme is more efficient than that of conventional algorithms.

In summary, the present approach to determining the seismic wave field in an anisotropic sub-surface is:
- More efficient
- More accurate
- No shear noise
- Simple to implement
- Numerically stable Although we have only discussed the algorithm for quasi-P wave, the proposed approach can be easily generalized to solve quasi-SV wave propagation problem or even the elastic attenuation problems etc. This may have value in the future for S-wave imaging or converted wave imaging.

This present solution of provides a way to solve a pseudo-differential equations. The attenuation equation is one example of another such equation.

The abbreviation "eq." is used to mean "equation" and the terms are used interchangeably herein.

Various modifications and improvements may be made without departing from the scope of the invention herein described.

REFERENCES

Alkhalifah T. 1998. Acoustic approximations for processing in transversely isotropic media. Geophysics 63, 623-631.

Alkhalifah T. 2000. An acoustic wave equation for anisotropicmedia. Geophysics 65, 1239-1250.

Bakker, P. M., and E. Duveneck, 2011. Stability analysis for acoustic wave propagation in tilted TI media by finite differences: Geophysical Journal International, 185, no. 2, 911-921.

Bube, K. P., T. Nemeth, J. P. Stefani, R. Ergas, W. Liu, K. T. Nihei, and L. Zhang, 2012; On the instability in second-order systems for acoustic VTI and TTI media: Geophysics, 77, no. 5 P. T171-T186.

Cheng J. and S. Fomel, 2013, Fast algorithms of elastic wave mode separation and vector decomposition using low-rank approximation for transverse isotropic media: Expanded Abstracts of 83rd Ann. Internat. Mtg., Soc. Expl. Geophys.

Chu C., B. K. Macy and P. D. Anno, 2013, Pure acoustic wave propagation in transversely isotropic media by the pseudospectral method: Geophysical Prospecting: 61(3), pages 556-567.

Duveneck E. and Bakker P. M. 2011. Stable P-wave modeling for reverse-time migration in tilted TI media. Geophysics 76, S65-S75.

Etgen J. T. and Brandsberg-Dahl S. 2009. The pseudo-analytical method: Application of pseudo-Laplacians to acoustic and acoustic anisotropic wave propagation. 79th Annual International Meeting, SEG, Expanded Abstracts, 2552-2556.

Fomel S., Ying L. and Song X., 2012, Seismic wave extrapolation using lowrank symbol approximation: Geophysical Prospecting, Volume 61, Issue 3, pages 526-536.

Fowler P. J., Du X. and Fletcher R. P. 2010a. Coupled equations for reverse time migration in transversely isotropic media. Geophysics, 75, S11-S22.

Fowler, P. J. and R. King, 2011. Modeling and reverse time migration of orthorhombic pseudo-acoustic P-waves: SEG, Expanded Abstracts, 30, no. 1, 190-195.

Guan, H., E. Dussaud, B. Denel, P. Williamson, 2011, Techniques for an efficient implementation of RTM in TTI media: 81st Annual International Meeting, SEG Expanded Abstracts, 3393-3397.

Jin, S., R. Madariaga, J. Virieux and G. Lambard, 1992, Two-dimensional nonlinear inversion of seismic waveforms, numerical results: Geophysics. 51, 1387-1403.

Kosloff. D., Fiiho A. Q., Tessmer E., Behle A., 1989, Numerical solution of the acoustic and elastic wave equations by a new rapid expansion method: Geophysical prospecting:37(4):383-394.

Lambaré. G., J. Virieux, R. Mandariaga, and S. Jin, 1992, Iterative asymptotic inversion in the acoustic approximation: Geophysics, 57, 1138-1154.

Liu F., Morton S. A., Jiang S., Ni L. and Leveille J. P. 2009. Decoupled wave equations for P and SV waves in an acoustic VTI media. 79th Annual International Meeting, SEG, Expanded Abstracts. 2844-2848.

Nemeth, T., Wu, C., and Schuster, G. T., 1999, Least-squares migration of incomplete reflection data: Geophysics, 64, 208-221.

Sun R., G. A. McMechan, H. Hsiao and J. Chow, 2004. Separating P- and S-waves in prestack 30 elastic seismograms using divergence and curl: Geophysics, 69, 286-297.

Thomsen, L., 1986, Weak elastic anisotropy: Geophysics, 51, 1954-1966.

Yan J. and P. Sava, 2009. Elasticwave-mode separation for VTI media. Geophysics 74, WB19-WB32.

Zhan G., R. Pestana and P. L. Stoffa, 2013, An efficient hybrid pseudospectral/finite-difference scheme for solving the TTI pure P-wave equation: Geophys. Eng. 10 025004

Zhang, H. and Y. Zhang, 2008, Reverse time migration in 3D heterogeneous TTI media: 78th Annual International Meeting, SEG, Extended Abstracts, 2196-2200.

Zhang H., G. Zhang and Y. Zhang, 2009. Removing S-wave noise in TTI reverse time migration. 79th Annual International Meeting, SEG, Expanded Abstracts, 2849-2853.

Zhang Y., H. Zhang and G. Zhang, 2011. A stable TTI reverse time migration and its implementation. Geophysics 76, WA3-WA11.

Zhang, H. and Y. Zhang, 2011, Reverse time migration in vertical and tilted orthorhombic media: SEG, Expanded Abstracts, 30, no. 1, 185-189.

Zhou H., G. Zhang and R. Bloor, 2006a. An anisotropic acoustic wave equation for VTI media. 68th Annual Conference and Exhibition, EAGE, Expanded Abstracts, H033.

Zhou, H., G. Zhang and R. Bloor, 2006b, An anisotropic acoustic wave equation for modeling and migration in 2D TTI media: 76th Annual International Meeting, SEG, Expanded Abstracts, 194-198.

The invention claimed is:

1. A computer-implemented method, comprising the steps of:
determining a wave field in an anisotropic subsurface of the Earth so as to improve computational efficiency, comprising: numerically solving with a processor a decoupled quasi-acoustic single wave mode wave equation based on spatially varied anisotropic parameters, to determine the wave field in the anisotropic subsurface; and
performing migration of seismic data using said wave field to provide an image of the subsurface,
wherein the wave equation comprises a spatial differential operator,
wherein all terms of the wave equation that contain one or more of the anisotropic parameters are separated out from the spatial differential operator, and
wherein the wave equation comprises a scalar operator, and the step of solving the wave equation comprises using the anisotropic parameters and a gradient of a predetermined wave field to compute the scalar operator,
wherein the wave equation is $$\frac{\partial^2 u}{\partial t^2} = v_0^2 \frac{\partial^2 u}{\partial z^2} + (1+2\varepsilon)v_0^2 \frac{\partial^2 u}{\partial x^2} + \left(v_0^2 \frac{\partial^2 u}{\partial z^2} + (1+2\varepsilon)v_0^2 \frac{\partial^2 u}{\partial x^2}\right)\Delta S_e,$$

$$\Delta S_e = \frac{1}{2}\left(\sqrt{1 - \frac{8(\varepsilon-\delta)n_x^2 n_z^2}{((1+2\varepsilon)n_x^2 + n_z^2)^2}} - 1\right),$$

wherein u is the wave field, t is time, $S_e$ is the scalar operator, $v_0$ is a velocity in the subsurface along an axis of symmetry of anisotropy, $n_x$ and $n_y$ are horizontal phase directions, $n_z$ is a vertical phase direction, and wherein $\varepsilon$ and $\delta$ are the anisotropic parameters.

2. The method as claimed in 1, which further comprises:
estimating the predetermined wave field;
determining the gradient of the predetermined wave field;
combining the scalar operator with a square of a velocity and the gradient of the predetermined wave field to obtain a combined result; and
using the combined result, determining the component of the wave field.

3. The method as claimed in claim 1, wherein the scalar operator is a scalar quantity.

4. A computer program product comprising a non-transitory computer-readable storage medium comprising machine readable instructions for performing the method as claimed in claim 1.

5. A computer device comprising a processor arranged to execute the machine readable instructions of claim 4 to perform said method.

* * * * *